United States Patent Office 3,238,123
Patented Mar. 1, 1966

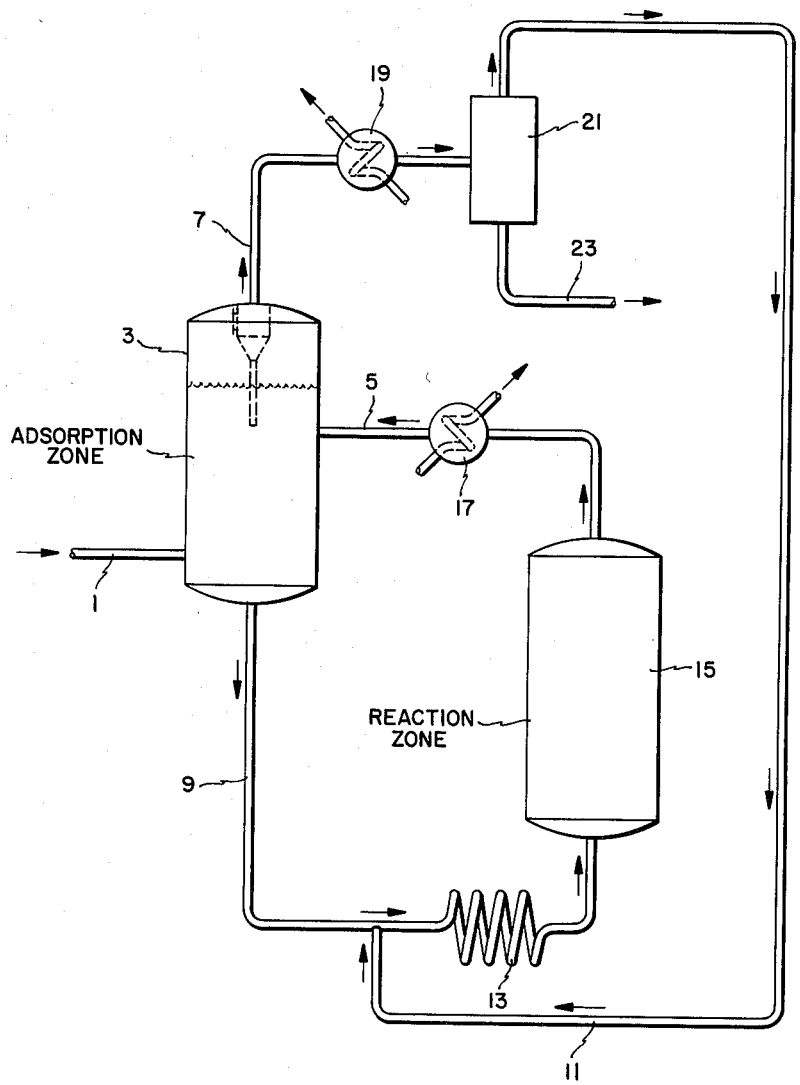

3,238,123
CATALYTIC HYDROFINING PROCESS
Alexis Voorhies, Jr., Baton Rouge, and Charles Newton Kimberlin, Jr., East Baton Rouge, La., assignors to Esso Research and Engineering Company, a corporation of Delaware
Filed May 11, 1962, Ser. No. 194,024
5 Claims. (Cl. 208—264)

The present invention deals with improved means for upgrading hydrocarbon oil streams. More particularly, it deals with a process wherein selected portions of a hydrocarbon feed stream are absorbed in the presence of a mixture of hydrocarbon conversion catalyst and crystalline alumino-silicate zeolites, and then subjected to conversion conditions so as to upgrade adsorbed hydrocarbon constituents.

It is, of course, well known in the art to improve the quality of various hydrocarbon oils by treating them with catalysts under varying conditions of conversion to effect such reactions as cracking, hydrocracking, hydrofining, aromatization, etc. Moreover, the use of crystalline alumino-silicate zeolites having effective pore diameters which may range from 4 to 15 Angstroms as adsorbents for hydrocarbon streams is now well known. Thus, selective fractions of the hydrocarbon streams have in the past been adsorbed on the crystalline zeolites. The adsorbents were then treated with a desorbing agent to remove a concentrated stream of adsorbed components and the adsorbed components then sent to a conversion operation. For example, a hydrocarbon fraction containing straight chain and branched chain hydrocarbons could be subjected to an adsorption step employing calcium alumino-silicate zeolites as adsorbents. The adsorbents are then desorbed, i.e., the large portion of adsorbed straight chain hydrocarbons taken from the initial hydrocarbon feed freed from the adsorbent, and the recovered stream of normal paraffins, etc., passed to a hydrocarbon conversion zone such as isomerization.

These prior procedures have suffered from various difficulties. For example, in the case where adsorbents were not employed and a hydrocarbon stream was to be subjected to a hydrofining operation, the entire feed was subjected to the hydrofining conditions and as a result, those parts of the feed which do not need hydrofining were still subjected to treatment. This resulted in various side reactions such as hydrocracking, etc., that consume hydrogen. Further there is dilution of the components; i.e., the relatively trace amounts of sulfur compounds, nitrogen compounds, color bodies and other highly unsaturated compounds which it is desirable to convert. In those cases wherein an adsorption step was employed as a means of concentrating the material to be subjected to ultimate conversion, a relatively complex number of steps were required. After the zeolite was saturated with a relatively large quantity of materials adsorbed from the initial feed stream, it had to be subjected to a desorption step such as by reducing pressure and elevating temperature, hot inert gas desorption, etc. Thereafter, the desorbed components were sent to the conversion zone, which operated essentially independently of the adsorption step. Various heat exchanging units, auxiliary facilities, recovery zones and intermediate storage containers as well as separation means for separating adsorbents from hydrocarbons and catalysts from hydrocarbons were required.

In accordance with the present invention, the above difficulties are avoided. More particularly, a hydrocarbon feed stream is contacted under adsorption conditions with a mixture of catalysts suitable for the desired conversion and crystalline alumino-silicate zeolites having an affinity for the material which it is desired to ultimately convert. The mixture of adsorbed hydrocarbon constituents, crystalline alumino-silicate zeolites and hydrocarbon conversion catalyst is then passed to a conversion zone wherein the adsorbed components are converted under reaction conditions. The reaction products are then recovered, preferably by the use of the initial feed hydrocarbons as desorbing medium while the mixture of catalyst and crystalline alumino-silicate adsorbent is re-employed for adsorbing additional quantities of hydrocarbons for further conversion.

The amount of feed adsorbed by the zeolites in the adsorption step of the present invention is less than 50 vol. percent. In general, it will be at least tenfold times the adsorptive capacity of the sieve entering said zone so that only a relatively small fraction, e.g., the most desirable constituents for conversion, is adsorbed on the zeolite in the initial adsorption stage and thus only these specific materials see the conversion zone by ultimate passage thereto. Thus, for example, in the case of hydrofining a hydrocarbon stream boiling in the range of 100° to 600° F., it is only the small amounts of sulfur compounds, nitrogen compounds, color bodies and other highly unsaturated materials which must be hydrofined in order to upgrade the feedstock. In accordance with the present invention, these specific constituents, i.e., less than 10 vol. percent of the initial feed, are adsorbed by the zeolite in the presence of the catalyst in the adsorption stage and the mixture of catalyst, adsorbed components and alumino-silicate zeolites thereafter sent to a hydrofining reaction. Therefore, the major portion of the initial feed is recovered directly as product without being subjected to hydrofining conditions, thus avoiding the useless consumption of hydrogen as well as the degradation of feed constituents not requiring hydrofining. In another type of operation the invention may be employed to overcome the disadvantages imposed by chemical equilibrium and thus permit the achievement of higher conversions than those dictated by equilibrium considerations. For example, in the hydroisomerization of normal hexane the thermodynamic equilibrium at the reaction temperature of about 650° to 700° F. will allow a conversion to a product comprising only about 75% isohexanes. However, by employing the present invention wherein the branched isomers are selectively removed from the system substantially 100% conversion of the straight chain hydrocarbon can be achieved. In an operation of this type as much as 49% of the initial feed may be adsorbed on the zeolite in the presence of the catalyst in the adsorption stage.

Thus, the present invention may find application in various hydrocarbon conversion processes such as aromatization, hydrocracking, hydrofining and hydroisomerization.

The conditions to be employed in the adsorption stage as well as in the reaction zone will, of course, depend on the particular hydrocarbon constituents to be recovered from the initial hydrocarbon feed and the particular conversion to which they are to be subjected. Table I sets forth a compilation of these conditions as well as types of crystalline alumino-silicate zeolites and conversion catalysts employed depending on the particular ultimate conversion reactions to be effected.

Table I

| Principal Conversion Desired | Alumino-Silicate Zeolite Type, Angstroms | Catalyst | Adsorption Zone Conditions | | Reaction Zone Conditions | |
|---|---|---|---|---|---|---|
| | | | Temp., °F. | Pressure, p.s.i.g. | Temp., °F. | Pressure, p.s.i.g. |
| Hydrofining | 6–15 | Cobalt Molybdate/$Al_2O_3$<br>Molybdena/$Al_2O_3$<br>Nickel Sulfide/$Al_2O_3$ | 400–600 | 100–1,000 | 500–750 | 100–1,000 |
| Hydrocracking | 6–15 | Nickel Sulfide/$SiO_2$—$Al_2O_3$<br>Pt on $SiO_2$/$Al_2O_3$ | 400–600 | 800–1,500 | 550–850 | 800–1,500 |
| Aromatization | 4.5–5.5 | $Cr_2O_3$/$Al_2O_3$ | 300–600 | 0–20 | 900–1,100 | 0–20 |
| Hydroisomerization | 4.5–5.5 | Pd/decationzed 13Y silica-alumina zeolite<br>Pt/$Al_2O_3$ | 400–600 | 400–700 | 650–700 | 400–700 |

In general, the zeolite will comprise 10 to 90, preferably 40 to 80, wt. percent of the mixture of catalysts and zeolite, with about 50 to 500, preferably 100 to 200, wt. percent of catalyst per barrel of adsorbed constituents being employed. Adsorption conditions range from 300z to 600° F. and 0 to 1500 p.s.i.g. and reaction conditions from 500° to 1100° and 0 to 1500 p.s.i.g.

Metallic alumino-silicate zeolites are characterized by their highly ordered crystalline structure and have pores of nearly uniform dimensions in the range of about 4 to 15 Angstroms. These crystalline molecular sieves have an alumino-silicate anionic cage structure in which the alumina and silica tetrahedra are intimately connected to each other. Metal cations or hydrogen are distributed throughout the structure to maintain electrical neutrality. The highly ordered dispersion of the silica and alumina tetrahedra makes for a large number of active sites, and the uniform pore openings of 4 to 15 Angstrom units allow for easy ingress of various hydrocarbon feed types as well as egress of the reaction products which may be formed by contact with the sieves.

The large pore zeolites, e.g. effective pore diameters of 6 to 15 Angstroms, have generally been referred to as "Type 13" molecular sieves and are preferred in the practice of the present invention when olefins, cyclic or aromatic constituents, or sulfur, oxygen or nitrogen comprising compounds are to be converted. A naturally occurring example thereof is the mineral faujasite. Synthetically produced alumino-silicates have been termed in the industry "13X" and "13Y" molecular sieves. Another large pore sieve, synthetic mordenite, having an effective pore diameter of about 10 Angstroms, has recently become available. The 4 to 5 Angstrom sieves are preferred for conversion processes wherein normal paraffins are to be the feed to the reaction zone.

The chemical formula of the anhydrous crystalline alumino-silicate zeolites, expressed in terms of mols, may be represented as:

$$0.9 \pm 0.2 Me_{\frac{2}{n}}O : Al_2O_3 : X SiO_2$$

wherein Me is one or more metal cations, $n$ is its valence, and X is a number from 1 to 14, preferably 2 to 12. The metal cation is preferably an alkali metal such as sodium or an alkaline earth metal such as calcium. It is noted that the zeolite serves basically as an adsorbent agent, and thus it normally is in the form of alkali or alkaline earth alumino-silicates, and thus will not have been exchanged with other metal cations.

Generally these crystalline zeolites are prepared by having present in the reaction mixture, $Al_2O_3$ as sodium aluminate, alumina sol and the like; $SiO_2$ as sodium silicate and/or silica gel and/or silica sol; and alkaline hydroxide, either free or in combination with the above components. Careful control is kept over the pH, the sodium ion concentration of the mix as well as the proportions of silica to alumina and soda to silica, the crystallization period, etc., all in a manner known, per se. A general scheme for preparing large pore crystalline alumino-silicate zeolites would be as follows:

Colloidal silica, such as commercial Ludox, is mixed with a solution of sodium hydroxide and sodium aluminate at ambient temperatures. The reaction mixture may be allowed to digest at ambient temperatures for periods of up to 40 hours or more, e.g. 24 hours. The reaction mixture is then heated to 180° to 250° F., preferably 200° to 220° F., for a period of 24 to 200 hours or more, preferably 50 to 100 hours, in order to effect crystallization. The crystalline metallic alumino-silicate may then be decanted and washed.

The following table sets forth a summary of the molar ratio of reactants normally employed in the synthesis of such uniform pore molecular sieves.

Table II

| Reactants (Mole Ratio) | General Range | Preferred Range for 4 to 5 A. | Preferred Range for 13X | Preferred Range for 13Y |
|---|---|---|---|---|
| $Na_2O/SiO_2$ in Reaction Mixture | 0.6–2 | 0.7–1.5 | 0.7–1.5 | 0.2–0.8, especially 0.28–0.45. |
| $SiO_2/Al_2O_3$ in Reaction Mixture | 1–40 | 1.5–2.5 | 2.5–5 | 8–30, especially 10–30. |
| $SiO_2/Al_2O_3$ in Crystalline Zeolite Product | 1–14 | 1–2.2 | 2–3 | 4–6, especially 5–6 |

Thus, the present invention is characterized by subjecting a hydrocarbon feed stream to contact with a mixture of crystalline alumino-silicate zeolite adsorbents and conventional hydrocarbon conversion catalysts so as to adsorb less than about 50% of the feed constituents, i.e., those most desired for conversion. Thereafter, the adsorbed components, zeolite and conversion catalysts are passed to a hydrocarbon conversion zone wherein only this minor quantity of hydrocarbon feed constituents is subjected to conversion. The resulting reaction products are separated from the mixture of zeolites and hydrocarbon conversion catalysts with the latter still in admixture being recycled for further adsorption. In general, the products of the hydrocarbon conversion are most conveniently recovered by passing the total effluent of the reaction zone to a portion of the adsorption zone, or an allied vessel, wherein the mixture is contacted with fresh feed. As new materials are adsorbed on the crystalline alumino-silicate zeolite adsorbent the reaction products are desorbed and may be recovered overhead.

The present invention is thus basically distinguished from the use of sieves as adsorbents for a major portion of the hydrocarbon feed fractions, desorbing the zeolites and then passing the desorbed stream to hydrocarbon conversion. As noted previously, in the present process there is no desorption of the crystalline alumino-silicate zeolites containing feed constituents, but rather the zeolites containing the adsorbed materials in admixture with the converison catalyst are directly passed to a conversion zone and then recycled to the adsorption zone. Conversion catalyst need at no time be removed from the crystalline alumino-silicate adsorption medium. Additionally, the present invention is distinguished from procedures wherein a crystalline alumino-silicate is employed to adsorb specific hydrocarbon fractions and then subjected to hydrocarbon conversion systems without added catalyst being present in either adsorption or conversion zones. In those processes, the zeolite is employed as the sole catalytic material and thus often a compromise may be struck between adsorptive ability and catalytic activity. Additionally, the present invention adsorbs only a small proportion of constituents from the initial hydrocarbon feed and subjects only the small proportion of constituents to catalytic conversion. The present invention can be used to overcome the limitations imposed by chemical equilibrium, and further is particularly suited to handling complex feed mixtures such as a sour naphtha feed or an unstable heating oil fraction, wherein only a small fraction, e.g. 5 to 10%, of the mixture needs be subject to conversion, or is amenable to conversion.

The various aspects and modifications of the present invention will be made more clearly apparent by reference to the following description, drawing and accompanying examples.

The attached drawing shows a typical integrated adsorption-conversion process operating in accordance with the present invention. For the purposes of illustration, a hydrofining operation treating a hydrocarbon feed boiling in the range of 200° to 350° F. is described although it is understood that a wide variety of feed streams such as naphthas, middle distillates, kerosenes and solvent naphthas could be treated by any of the aforementioned hydrocarbon conversion catalysts.

Turning to the drawing, the vaporized feed is passed via line 1 into adsorption zone 3. Adsorption zone 3 may take the form of any of a variety of contacting zones, e.g. fluidized or fixed bed, slurry, etc. In the present embodiment within adsorption zone 3 there is contained a fluidized bed of a mixture of sodium alumino-silicate zeolites having a silica/alumina ratio of about 2.7 (conventionally termed 13X molecular sieves) and a hydrofining catalyst such as 12 wt. percent cobalt molybdate on alumina. The mixture of zeolite adsorbent and catalyst enters zone 3 by line 5 as will be hereinafter explained. The temperature in adsorption zone 3 is in the range of about 450° to 550° F. and the pressure is about 180 p.s.i.g. The amount of feed entering zone 3 via line 1 is at least tenfold and preferably twentyfold or more times the adsorptive capacity of the sieve entering zone 3 by line 5. In the present embodiment the feed rate thus is 10 to 30 volumes per volume of zeolite per hour. Under these conditions only 5 to 10% or less of the feed is adsorbed by the crystalline alumino-silicate absorbent. This portion of the feed which is adsorbed comprises the more polar and unsaturated materials such as sulfur, nitrogen, oxygen compounds, the color bodies and other unstable components which are desired to be converted via the hydrofining reaction. The more saturated unadsorbed fraction comprising 90 to 95% or more of the feed passes from zone 3 by line 7 and is recovered as product without being subjected to the hydrofining conditions of reaction zone 15. Thus, useless consumption of hydrogen as well as degradation of the major proportion of the initial feed stream constituents is avoided. The mixture of catalyst and zeolite containing absorbed color bodies, sulfur compounds, etc., leaves zone 3 by line 9. It is mixed with hydrogen from line 11 and passes through heater 13 into hydrofining zone 15. In general, the hydrogen from line 11 amounts to 500 to 5,000 s.c.f. per barrel, preferably about 2,000 s.c.f. per barrel of adsorbed components on the molecular sieves in line 9.

The temperatures in reaction zone 15 are maintained at a level, preferably of about 550° to 750° F. and the pressure may be about 100 to 300, e.g. 200 p.s.i.g. Under these conditions the color bodies, sulfur compounds, etc., present on the adsorbed molecular sieve zeolite are converted by the hydrofining reaction to more stable and more desirable components. The mixture of the catalyst and zeolite together with the hydrofined products and hydrogen leave zone 15 by line 5, and are then normally passed through a heat exchanger 17, and then re-enter adsorption zone 3. The hydrofined products are therein displaced from the zeolite adsorbent by the less saturated and more polar constituents from the fresh feed introduced into adsorption zone 3 via line 1. The hydrofined products, together with the unadsorbed components of the fresh feed, leave zone 3 by line 7. They may pass overhead through condenser 19 into a liquid gas separator 21 wherein the condensed product is withdrawn by line 23 and the hydrogen may be recycled to the feed to the hydrofining zone, or directly to the hydrofining zone, by line 11.

Thus for the feed boiling in the range of 200° to 350° F. sent to the hydrofining zone, only about 5 vol. percent of the feed is adsorbed by the 13X type sodium silico-aluminate adsorbent. It is only this adsorbed material which is subjected to hydrofining. The ultimate total product recovered overhead from the adsorption zone via line 7 has improved qualities as for example: a decreased content of sulfur, nitrogen and oxygen, an improved stability and better odor and color, and lower content of olefins and other unsaturated materials.

In the case of employing the present invention in the hydrocracking of hydrocarbon constituents, the following is a representative example of such a procedure.

A middle distillate hydrocarbon stream, boiling in the range of 350° to 550° F., is passed to an adsorption zone operating at 550° F. and 1500 p.s.i.g. wherein 15% of the initial feed constituents are adsorbed. The zeolites are calcium alumino-silicate materials having silica to alumina ratios of about 5.2. The hydrocracking catalyst is a 6% nickel sulfide catalyst on a silica-alumina base and comprises 25 vol. percent of the admixture of molecular sieve zeolite and catalyst and is employed in an amount of about 150 wt. percent of feed constituents adsorbed. The combined admixture containing adsorbed components is then passed to a hydrocracking reaction stage operating at a temperature of 650° F. and a pressure of 1500 p.s.i.g. with about 15,000 s.c.f. of hydrogen being added per barrel of feed constituents adsorbed on the zeolites. The resulting hydrocracked materials can be withdrawn overhead via a distinct desorption step and if desired combined with the unconverted hydrocarbon constituents not initially adsorbed on the zeolite adsorbents. Alternatively, the reaction effluent may be sent in total to the adsorption zone wherein products are desorbed by the feed. Products distribution of the fraction not subjected to adsorption and the product recovered directly from the hydrocracking stage (assuming it wasn't combined with the non-converted feed stream) is set forth below.

|  | Boiling Range, °F. | Vol. Percent of Initial Feed |
|---|---|---|
| Unadsorbed Fraction | 350–550 | 85 |
| Hydrocracked Fraction | 350+ | 4.5 |
|  | $C_5/350$ | 11.4 |
|  | $C_4$ | 1.4 |
|  | $C_3-$ | 0.4 wt. percent |

The unadsorbed fraction and the 350° F.+ boiling hydrocracked fraction comprises a high luminosity jet fuel. The $C_5/350$° F. boiling fraction comprises a premium quality gasoline blending stock.

The present invention may be employed to advantage in a process for the isomerization of the normal paraffins in naphtha fractions. It has been found that a catalyst comprising about 0.5 wt. percent of palladium on a decationized form of 13Y molecular sieve has excellent activity for the isomerization of normal $C_5$ and $C_6$ paraffins. However, it has heretofore not been practical to employ this catalyst when feeding a total $C_5/C_6$ boiling range naphtha since such feeds also contain naphthenic hydrocarbons and these are hydrocracked to gases by the catalyst under isomerization conditions resulting in an undesirably low yield of isomerized product. However, when operating according to the present invention and employing an admixture of adsorbent comprising a calcium alumino-silicate 5 A. molecular sieve and the catalyst comprising 0.5 wt. percent Pd on decationized 13Y sieve the naphthenes are rejected in the adsorption zone and only the normal paraffins are subjected to the hydro-isomerization conditions in the reaction zone. For example, a $C_5/C_6$ naphtha from Arabian crude comprising about 18% normal pentane, 35% normal hexane, and about 8% cyclohexane and methylcyclopentane is passed to an adsorption zone operating at 550° F. and a pressure of 600 p.s.i.g. wherein about 49% of the initial feed comprising normal hexane and normal pentane is adsorbed. The adsorption zone contains a mixture of 75% of a calcium alumino-silicate 5 A. molecular sieve which selectively adsorbs normal paraffins and 25% of a catalyst comprising 0.5 wt. percent Pd on decationized 13Y molecular sieve. The combined mixture containing adsorbed normal paraffins is then passed to a hydroisomerization zone operating at 675° F. and 600 p.s.i.g. with about 4,000 s.c.f. of hydrogen being added per barrel of adsorbed normal paraffins. Under these conditions the normal paraffins are isomerized to a near equilibrium mixtue comprising about 65% isopentane based on total pentane and 78% isohexanes based on total hexane. The mixture is now returned to the adsorption zone whence the isomerized paraffins leave the system together with the unadsorbed portion of the initial feed.

Various modifications may be made to the present invention. Thus, while recycling the total effluent of the reaction zone to the adsorption stage is preferred as a means of eliminating a separate desorption step, a separate step for removal of reaction products from the admixture of zeolite and catalyst can be employed. Depending upon the hydrocarbon conversion system, suitable heat exchangers can heat or cool the streams being passed between the adsorption zone and reaction zone in order to maximize the heat economies in the over-all process.

Having described the present invention that which is sought to be protected is set forth in the following claims.

What is claimed is:

1. An improved hydrofining process which comprises contacting a hydrocarbon stream boiling in the range of 100° to 600° F., with an admixture of a hydrofining catalyst and crystalline alumino-silicate zeolites at a temperature of 400° to 600° F. under conditions so as to adsorb less than 10 vol. percent of the initial feed stream, the amount of said hydrocarbon stream being at least 10 times the adsorptive capacity of said crystalline aluminosilicate zeolites, thereafter passing said admixture of zeolites, adsorbed components and hydrofining catalyst to a hydrofining reaction zone operating at a temperature of 650° to 800° F. wherein adsorbed components are converted in the presence of hydrogen, and recovering the resulting hydrofining products.

2. The process of claim 1 wherein said hydrofining catalyst comprises cobalt molybdate.

3. The process of claim 1 wherein the total effluent of said hydrofining zone is passed to said adsorption zone, fresh oil feed displacing adsorbed reaction products from said crystalline alumino-silicate zeolites, and recovering said hydrofined products.

4. The process of claim 1 wherein said alumino-silicate zeolites and hydrofining catalysts are recycled as an admixture between said adsorption and conversion zones and wherein said zeolite comprises 40 to 80 wt. percent of said admixture and 50 to 500 wt. percent of hydrofining catalyst is employed per barrel of adsorbed constituents.

5. The process of claim 1 wherein said crystalline alumino-silicate zeolite may be represented as

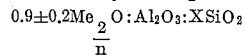

wherein Me is a member of the group consisting of alkali metals and alkaline earth metals, $n$ is its valence and X is a number from 1 to 12.

References Cited by the Examiner
UNITED STATES PATENTS

| 2,834,429 | 5/1958 | Kinsella et al. | 183—114.2 |
| 2,859,170 | 11/1958 | Dickens et al. | 208—85 |
| 2,971,904 | 2/1961 | Gladron et al. | 208—135 |

DELBERT E. GANTZ, *Primary Examiner.*

ALPHONSO D. SULLIVAN, *Examiner.*